(12) United States Patent
Marson

(10) Patent No.: US 10,384,414 B2
(45) Date of Patent: Aug. 20, 2019

(54) CELLULAR MATRIX WITH INTEGRATED RADIANT AND/OR CONVECTION BARRIERS PARTICULARLY FOR USE WITH INFLATABLE BODIES

(75) Inventor: James Marson, Seattle, WA (US)

(73) Assignee: Cascade Designs, Inc., Seattle, WA (US)

(*) Notice: Subject to any disclaimer, the term of this patent is extended or adjusted under 35 U.S.C. 154(b) by 0 days.

(21) Appl. No.: 12/842,027

(22) Filed: Jul. 22, 2010

(65) Prior Publication Data

US 2011/0013299 A1  Jan. 20, 2011

Related U.S. Application Data

(63) Continuation of application No. PCT/US2009/000474, filed on Jan. 22, 2009.

(51) Int. Cl.
*B32B 3/12* (2006.01)
*B32B 3/04* (2006.01)
(Continued)

(52) U.S. Cl.
CPC .................. *B32B 3/04* (2013.01); *B32B 3/28* (2013.01); *B32B 5/02* (2013.01); *B32B 5/022* (2013.01);
(Continued)

(58) Field of Classification Search
CPC .. B32B 3/04; B32B 3/28; B32B 5/022; B32B 27/36; B32B 7/05
(Continued)

(56) References Cited

U.S. PATENT DOCUMENTS 2,369,006 A * 2/1945 Banks ........................ 156/221
3,018,205 A * 1/1962 Barut ......................... 428/116
(Continued)

FOREIGN PATENT DOCUMENTS

KR  20-0325036 Y1  9/2003
WO  WO 2004/052637  *  6/2004

OTHER PUBLICATIONS

International Search Report for PCT Application No. PCT/US2009/000474, dated Sep. 30, 2009, 3 pages.

*Primary Examiner* — Ricky D Shafer
(74) *Attorney, Agent, or Firm* — P.G. Scott Born; Foster Pepper PLLC

(57) ABSTRACT

Cellular matrices generally having a plurality of generally identical cells (open-ended geometric prisms) arranged to form a repeating geometric form, and characterized by radiant and/or convection barriers at each cell to mitigate undesired thermal transmission in a plurality of directions there through. Barriers of various embodiments include non-film sheet material, such as non-woven (e.g., spun) or batting-type sheet material as well as a foam sheet material, which may be substituted for some or all of the film material otherwise comprising the matrix, and/or integration of a thermally reflective film or coating into the matrix and/or enveloping panels of an inflatable body to provide enhanced thermal radiation mitigation means. When used in conjunction with inflatable bodies, axes of the cells are oriented parallel to exteriorly exposed panels that define the chamber of the inflatable body in which the matrix is disposed, and in certain embodiments the panels defining the chamber also comprise portions of the matrix.

3 Claims, 4 Drawing Sheets

(51) Int. Cl.
  *B32B 3/28* (2006.01)
  *B32B 5/18* (2006.01)
  *B32B 27/34* (2006.01)
  *B32B 27/36* (2006.01)
  *B32B 27/40* (2006.01)
  *B32B 5/02* (2006.01)
  *B32B 5/24* (2006.01)
  *B32B 27/06* (2006.01)
  *B32B 7/05* (2019.01)

(52) U.S. Cl.
  CPC .................. *B32B 5/18* (2013.01); *B32B 5/24* (2013.01); *B32B 7/05* (2019.01); *B32B 27/06* (2013.01); *B32B 27/34* (2013.01); *B32B 27/36* (2013.01); *B32B 27/40* (2013.01); *B32B 2250/44* (2013.01); *B32B 2255/10* (2013.01); *B32B 2255/205* (2013.01); *B32B 2262/0276* (2013.01); *B32B 2266/0264* (2013.01); *B32B 2266/0278* (2013.01); *B32B 2307/304* (2013.01); *B32B 2307/306* (2013.01); *B32B 2307/54* (2013.01); *B32B 2307/718* (2013.01); *B32B 2307/724* (2013.01); *B32B 2307/726* (2013.01); *B32B 2307/7242* (2013.01); *B32B 2307/7265* (2013.01)

(58) Field of Classification Search
  USPC ...... 359/831, 832; 428/59, 71–73, 116, 118, 428/131, 182–186, 313.3; 297/214; 52/793.1; 5/681, 682, 671, 706, 710, 5/714, 686, 705, 711
  See application file for complete search history.

(56) References Cited

U.S. PATENT DOCUMENTS

| | | | | |
|---|---|---|---|---|
| 3,707,009 | A * | 12/1972 | Wagner | 428/116 |
| 4,017,347 | A * | 4/1977 | Cleveland | 156/89.27 |
| 4,612,225 | A * | 9/1986 | Graffam et al. | 428/116 |
| 5,039,567 | A * | 8/1991 | Landi et al. | 428/116 |
| 5,180,619 | A * | 1/1993 | Landi et al. | 428/116 |
| 5,840,400 | A * | 11/1998 | Landi et al. | 428/116 |
| 7,288,326 | B2 * | 10/2007 | Elzey et al. | 428/593 |

* cited by examiner

CELLULAR MATRIX WITH INTEGRATED RADIANT AND/OR CONVECTION BARRIERS PARTICULARLY FOR USE WITH INFLATABLE BODIES

BACKGROUND OF THE INVENTION

The invention described in PCT/US2003/039259 relates to a novel film-based cellular matrix that creates a plurality of repeating geometric cells such that when placed on end, forms a suitable core to an inflatable body. While that invention pioneered the concept of commercially feasible film-based cellular matrices particularly for use in the arts of inflatable bodies, use of this technology caused a material loss of inherent thermal transfer resistance when compared to prior core configurations for such articles. And while use of radiant barriers as a component of a cell wall is disclosed, the only disclosed orientation of the open-ended cells is with the major axis of the cell being orthogonal to the opposing panels comprising the outer envelope of the inflatable body. This orientation results in an unimpeded fluid/gas conduit from one panel to an opposing panel, although this core orientation is considered advantageous from the perspective of self-inflation (once compressed, the material in this orientation provides a restorative force that facilitates self-inflation of the envelope surrounding the core). As noted in the referenced publication, the intrinsic restorative force would be insufficient if the core orientation was otherwise.

SUMMARY OF THE INVENTION

The invention is characterized in part as an improvement of and to the innovations disclosed in PCT/US2003/039259, which is incorporated herein by reference, and further is directed to inflatable bodies incorporating embodiments of the invention. More particularly, the present invention is directed towards a cellular matrix having integrated radiant and/or convection barriers, methods for making such matrices, articles of manufacture incorporating such matrices as a core thereof and methods for making such articles of manufacture.

As is well known by the skilled practitioner, heat energy or thermal transfer takes place via three modes: conductive (direct transfer of molecular kinetics), convective (indirect transfer of molecular kinetics through a dynamic medium) and radiant (emission and absorption of electromagnetic radiation). The very presence of a thermally non-conductive cellular matrix functioning as a core of an inflatable body according to the invention disclosed in PCT/US2003/039259 arrests any appreciable conductive modes of heat or thermal transfer. However, heat or thermal transfer through such disclosed core via convection and radiation modes remains virtually unchecked, given the lack of thermal barriers in the axial direction (i.e., the direction orthogonal to the opposing panels comprising the envelope when the envelope is placed on a supporting surface that is itself orthogonal to gravitational acceleration). And while radiant barriers incorporated into the envelope panels is suggested by the prior art, none of the prior art discloses modifications to the cellular matrix itself in order to improve thermal performance nor changes in the matrix orientation when used as a core for an inflatable body.

The cellular matrix of various invention embodiments is generally characterized as a plurality of generally identical cells (open-ended geometric prisms) arranged to form a repeating geometric form, and comprise radiant and/or convection barriers at each cell to mitigate undesired thermal transmission in a plurality of directions there through. The matrix is particularly suited for use as a core between two opposing panels, wherein the cellular axes of the matrix are parallel to at least one virtual panel plane and the panels are preferably sealed about a common perimeter to create a flexible, fluid impervious envelope, to which the core may or may not be bonded. Depending upon the embodiment, at least some cells of the matrix may comprise or be defined by portions of the envelope panels.

In selected embodiments, a plurality of substantially triangular prisms comprises the cellular matrix. Within this group of embodiments, the triangular prisms may be either registered or non-registered (the meaning of these terms being defined below), wherein each prism is defined by two portions of a corrugating film or other material, and one portion of a generally planar film or other material (the meaning of these terms also being defined below).

The terms "row", "column", "registered", "non-registered", "serpentine" or "corrugating" with respect to a film or material, and "planar" with respect to a film or material are used herein. When in a substantially expanded state, a matrix "row" is characterized as laterally repeating geometric forms having perceptible, and generally spatially constant, upper and lower boundaries, as shown in the Figures herein; a "column" is defined as a direction orthogonal to the direction of a row, as shown in the Figures herein. The term "registered" is used where the shape and orientation of adjacent cells within a row are orthogonally consistent, (stated alternatively, the shape, relative position and orientation of the geometric forms in any given column are substantially the same in each row). The term "non-registered" or "offset" is used where every other row of cells are registered, i.e., the shape and orientation of the geometric form in adjacent rows for any given column are not the same, and are usually mirror images thereof. The terms "serpentine" and "corrugating" are used interchangeably and reference films or materials that form two of three sides of cells in a matrix embodiment of the invention when the matrix is in an expanded state; the term "planar" references a film or material that forms one of three sides of such cells and assumes a generally planar geometry also when the matrix is in an expanded state.

Enhanced thermal performance over the cellular matrix and its applications described in PCT/US2003/039259 is achieved through the use of alternatives to the film strips and/or core orientation described therein, although the basic geometric constitution of the matrix/core according to the present invention embodiments remains substantially the same. Turning first to the change in core orientation, advances in matrix manufacturing techniques have permitted the use of sheets of film or other flexible material as opposed to strips of film. The result of such advances is the ability to create comparatively long (or "high" in a geometric sense) prisms (cells). Consequently, the orientation of a matrix functioning as a core in an inflatable body can be changed so that the prism's longitudinal axis (or height direction in a geometric sense) is parallel to a virtual plane defined by a major surface of an upper/lower outer panel of an inflatable body (i.e., not orthogonal to such plane(s)).

As a consequence of this change in matrix orientation, a plurality of cell walls exists in the orthogonal direction relative to the referenced virtual plane, which beneficially mitigate convection mode heat transfer. It is of course recognized that as a consequence of this change in core orientation, shape restorative forces within the core are reduced (in certain inflatable body embodiments, this affects the self-inflation characteristics of the body). Nevertheless, convection mode heat transfer losses are significantly lessened. Moreover, by incorporating radiant barriers with or instead of a thin film material as part of the cell walls (corrugated and/or linear film sheets), heat loss via radiation is significantly lessened.

Many embodiments of the invention are intended to return resiliency to such articles as referenced in the preceding paragraph by using materials other than thin film sheets for the cell walls. Moreover, these materials preferably significantly increase thermal performance of the matrix or resistance of the core to heat transfer via a thermal convection mode. Remembering that if a core is used in an inflatable (self inflating or otherwise) body at least some the cell walls should be fluid/gas permeable, the opportunity for thermal performance loss via convection is real and measurable. By selectively using materials for cell walls that are both resilient and function as effective thermal convection mitigation means, one can then achieve the synergistic benefits offered by the combination.

In view of the foregoing, the various invention embodiments described herein comprise a non-film sheet material, preferably but not exclusively a non-woven (e.g., spun) or batting-type sheet material as well as a foam sheet material, that may be substituted for some or all of the conventional strips of film disclosed in PCT/US2003/039259 to provide enhanced thermal convection mitigation means, and/or integration of a thermally reflective film or coating into the matrix and/or enveloping panels of an inflatable body to provide enhanced thermal radiation mitigation means. With respect to embodiments of the invention providing enhanced thermal convection mitigation means, non-film sheet materials such as non-woven or batting-type sheet material as well as foam sheet material may be substituted for the serpentine or corrugating film sheets and/or the planar film sheet(s) in a cellular matrix arrangement. The selection of appropriate film sheet substitute material(s) include(s) recognition of the interface requirements between materials (between native film(s) and substitute material(s), or between a first substitute material and second substitute material), as well as between the film/substitute material(s) and the internal surfaces of the opposing panels comprising the fluid impervious envelope if applicable.

Similarly, with respect to embodiments of the invention providing enhanced thermal radiation mitigation means, the selection of appropriate film sheet substitute material(s) or treatment of conventional film(s)/material(s) includes recognition of the interface requirements between materials (between native film(s) and substitute material(s) or treated film(s)/material(s), or between a first substitute material or treated film(s)/material(s) and a second substitute material or treated film(s)/material(s)), as well as between the film/substitute/treated materials and the internal surfaces of the opposing panels comprising the fluid impervious envelope if applicable.

Consequently, not every sheet material having a desired level of resistance to convection or radiant heat transfer modes will be a suitable candidate for conventional film sheet substitution. One must ascertain the chemical and bonding properties of the cell wall film sheets in order to select an appropriate substitute, and optionally for article embodiments wherein the core acts as a tension member, one must consider the chemical and bonding properties of the interior surface of the opposing panels or any intermediate material that will come into retaining contact with at least part of the core.

For embodiments wherein at least one side of at least some matrix cells comprise a thin film sheet, suitable candidate materials for such film sheet include, but are not limited to, nylon, polyester and polyurethane. As a consequence, suitable candidate thin film substitute sheet materials for mitigating convection heat loss include, but are not limited to, nylon, polyester and polyurethane. Of these suitable substitute materials, open cell polyurethane foam, polyester foam or polyester batting also provide measurable levels of loft in a core when compressed and then permitted to restore, and therefore are considered desirable candidate materials for self-inflating body cores. Suitable candidate thin film sheet substitute materials for mitigating radiant heat loss include, but are not limited to, aluminized nylon, polyester and polyurethane films. Of course the foregoing exemplary materials do not necessarily take into account bonding issues between such film substitutes and/or an inner surface of any envelope panel. For embodiments of the invention wherein the cellular matrix is heat bonded to such panels, preferred convention mitigating substitute materials include open cell polyurethane foam, polyester foam or polyester batting while preferred radiation mitigating substitute materials include aluminized polyurethane or polyester film.

Because preferred embodiments of the invention relating to inflatable bodies have the cellular matrix core oriented such that the major axis of the cells are parallel to the plane of the envelope panels, it is possible as well as desirable to integrate both convention and radiant barriers. And because each cell in the cellular matrix comprises at least two discrete films (e.g., a corrugating film and a substantially planar film), at least one film can utilize convection mitigating substitute materials and at least one film can utilize radiation mitigating substitute materials. In this manner, the advantages of a core constructed with a cellular matrix can be achieved, and the attendant thermal deficiencies significantly mitigated. Selection of which type of film substitute material should be used for which cellular wall may be driven by thermal performance criteria, and/or by physical criteria such as loft (in the self-inflating body arts, restoration force is considered important to overall performance). Thus, a loft possessing material may be substituted for the corrugating film since there is more material per unit volume than if substituted for the substantially planar film if enhanced loft properties are desired.

As with the method of making a film-based cellular matrix disclosed in PCT/US2003/039259, one method of making a first embodiment of the present invention broadly comprises a) selectively bonding a first serpentine or corrugating sheet of polymeric material selected from the group consisting of a convection barrier and a radiant barrier to a first generally planar sheet of polymeric material selected from the group consisting of a convection barrier and a radiant barrier to thereby form a first plurality of open-ended hollow prisms or cells wherein each prism includes an enclosing wall having a plurality of segments, an inner surface and an outer surface, and the first serpentine sheet defines a first enclosing wall segment and a second enclosing wall segment of each prism and the first generally planar sheet defines a third enclosing wall segment of each prism; b) selectively bonding a second generally planar sheet of polymeric material selected from the group consisting of a convection barrier and a radiant barrier to a portion of the enclosing wall generally opposite the third enclosing wall segment of each prism; and c) selectively bonding a second serpentine sheet of polymeric material selected from the group consisting of a convection barrier and a radiant barrier to the second generally planar strip of polymeric material to thereby form a second plurality of open-ended hollow prisms wherein the second serpentine strip defines a first enclosing wall segment and a second enclosing wall segment of each prism and the second generally planar strip defines a third enclosing wall segment of each prism. Additional planar and serpentine sheets are bonded to the forming matrix until a desired number of rows are completed.

It should be noted that because the portion of the enclosing wall generally opposite the third enclosing wall segment of each prism for any given row is also the bonding location for a corresponding structure for each prism for an adjacent row or course, the bonding of each serpentine sheet to the generally planar sheet can be accomplished in one action.

As was the case with the matrix of PCT/US2003/039259, the resulting matrix of the present invention can be described as a matrix of cells comprising a plurality of courses or rows having at least a first type of cell alternating with a second type of cell to form a repeating sequence of geometric prisms that share common lateral sides and that have a generally constant height when in an expanded state. In this embodiment, each subsequent row is non-registered or offset from adjacent rows.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

DESCRIPTION OF INVENTION EMBODIMENTS

Preface: The terminal end of any numeric lead line in the several drawings, when associated with any structure or process, reference or landmark described in this section, is intended to representatively identify and associate such structure or process, reference or landmark with respect to the written description of such object or process. It is not intended, nor should be inferred, to delimit or define per se boundaries of the referenced object or process, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

With the foregoing in mind, the following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 1:
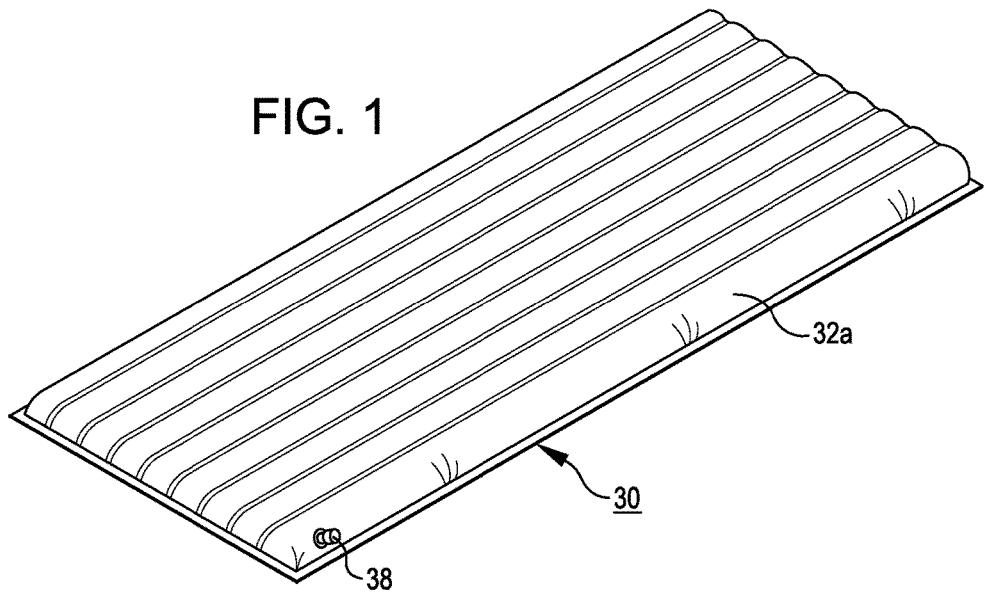
FIG. 1 is a perspective view of an inflatable body comprising a cellular matrix core according to the invention.
Figure 2:
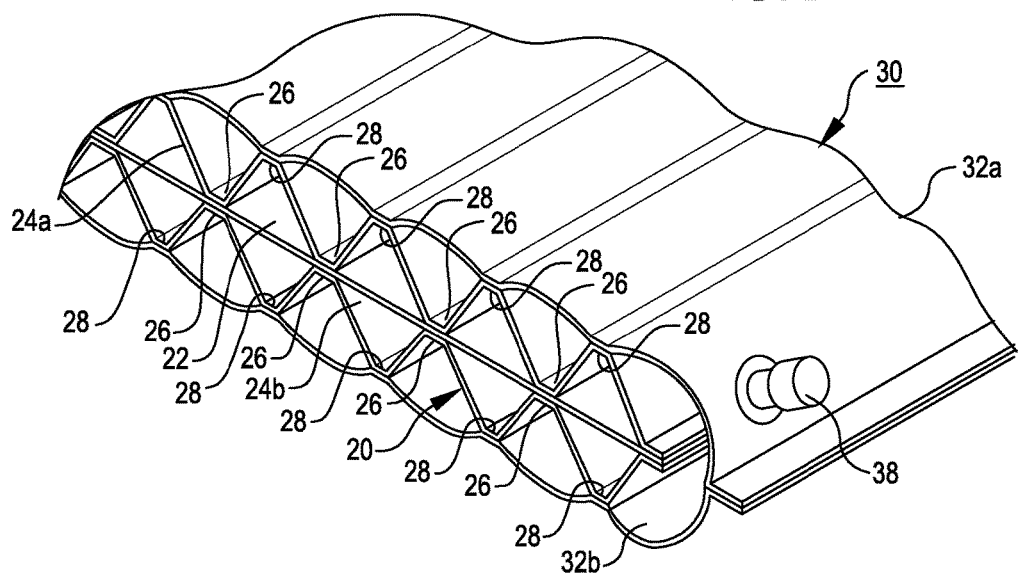
FIG. 2 is a detailed perspective view with cross section of the inflatable body of FIG. 1 wherein the core is representative of a first invention embodiment.
Figure 3:
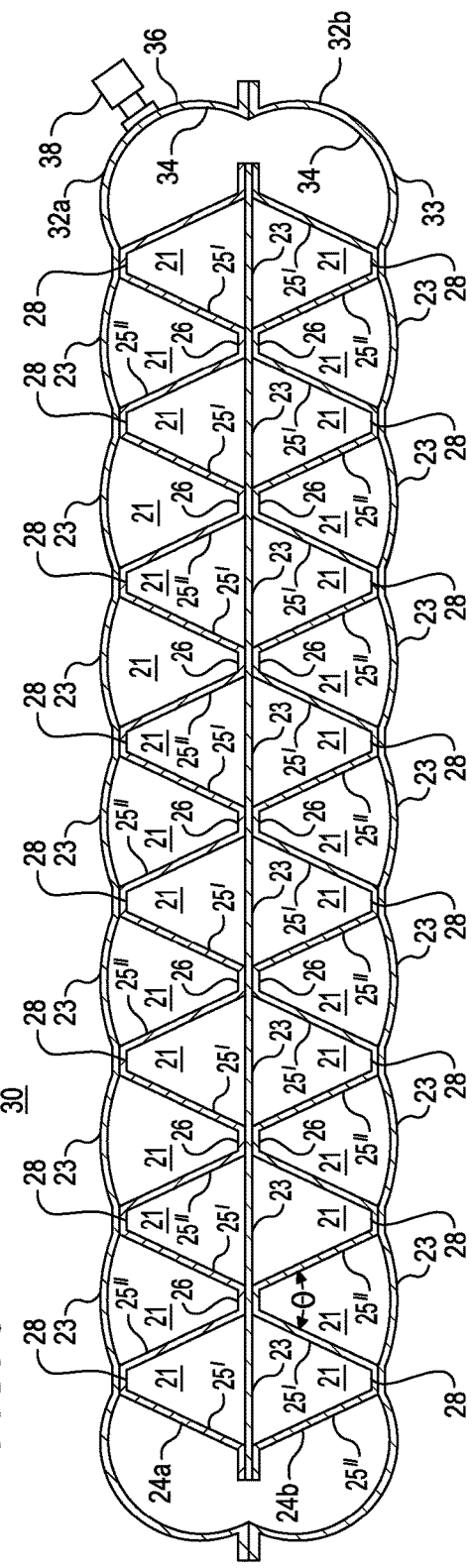
FIG. 3 is a cross section of the inflatable body of FIG. 2.
Figure 5:
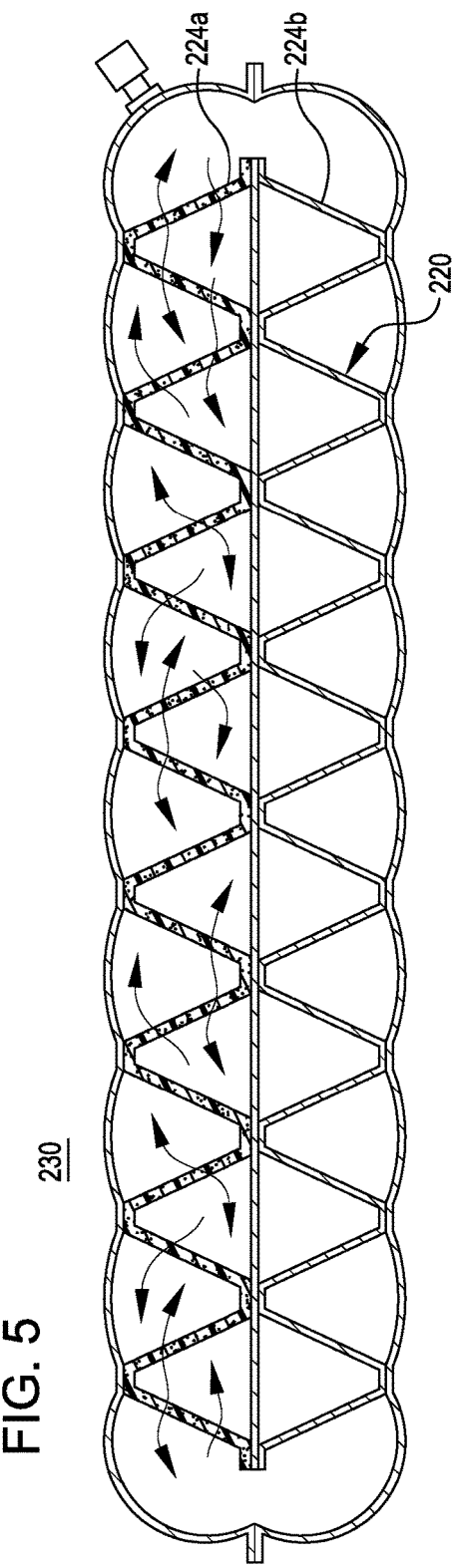
FIG. 5 is a cross section of an inflatable body having a core representative of a third invention embodiment.
Figure 6:
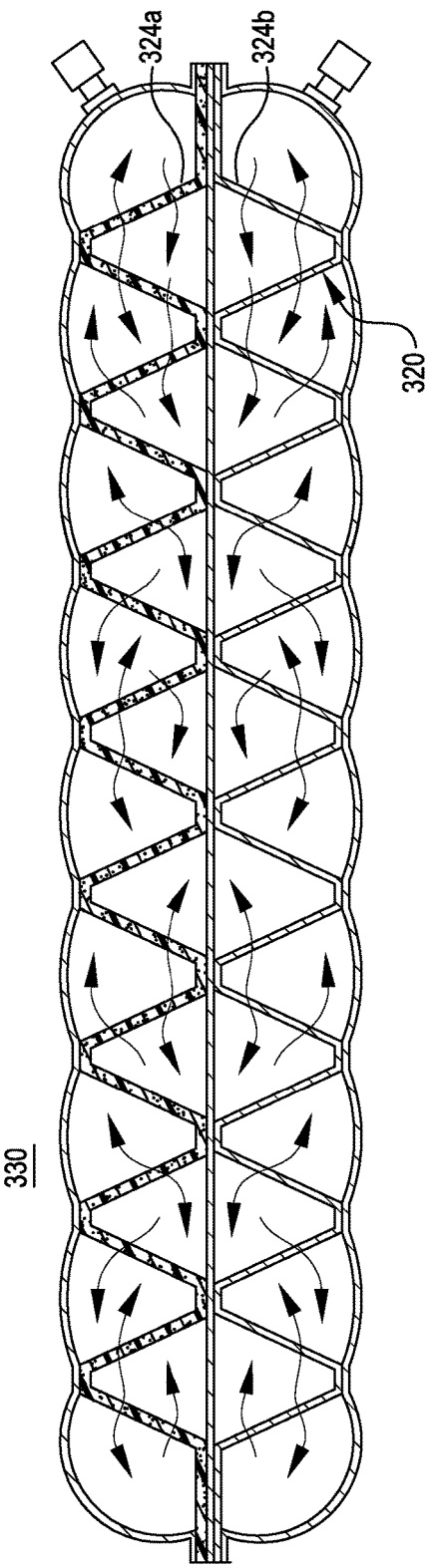
FIG. 6 is a cross section of an inflatable body having a core representative of a fourth invention embodiment.
Figure 7:
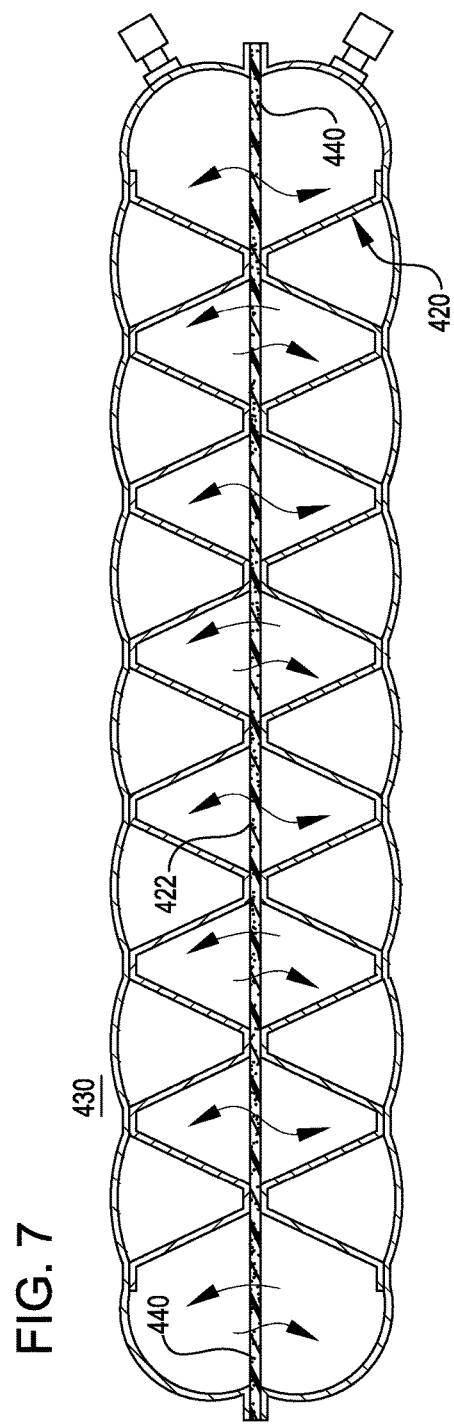
FIG. 7 is a cross section of an inflatable body having a core representative of a fifth invention embodiment.

Turning then to the several embodiments, wherein like numerals indicate like parts, and more particularly to FIGS. 1-3, a general configuration of matrix core 20 ( 120 in the embodiment illustrated in FIG. 4, 320 in the embodiment illustrated in FIG 6, 420 in the embodiment illustrated in FIG. 7) is shown in conjunction with inflatable body 30 (330 in the embodiment illustrated in FIG. 6, 430 in the embodiment illustrated in FIG. 7). Core 20, which in this embodiment is comprised only of thin urethane films in the form of film sheets, includes planar sheet 22 to which is bonded first corrugating or serpentine sheet 24a and second corrugating or serpentine sheet 24b (collectively or generally referred to as corrugating or serpentine sheet(s) 24), 124a and 124b in the embodiment illustrated in FIG. 4, 224a and 224b in the embodiment illustrated in FIG. 5, 324a and 324b in the embodiment illustrated in FIG. 6). Each corrugating or serpentine sheet 24 comprises proximal apexes 26 (126 in the embodiment illustrated in FIG. 4) and distal apexes 28 (128 in the embodiment illustrated in FIG. 4), which are preferably heat or RF bonded to the adjacent material; the material between the two apexes constituting one side of two adjacent cells 21. In this illustrated embodiment, proximal apexes 26 of corrugating or serpentine sheets 24a and 24b are bonded to planar sheet 22 in general opposition to each other such that tension stress induced in sheet 24a, for example, transfers nearly directly to sheet 24b, and vice versa. As will be described in greater detail below, this effective transference of tension forces beneficially provides the necessary tensile elements in certain article embodiments of the invention, and permits the use of relatively low tensile strength substitute materials in planar sheet 22.

Matrix core 20 is shown disposed in, and partially bonded to, inflatable body 30. Inflatable body 30 comprises first and second panels 32a and 32b, each having inner and outer surfaces 34 and 36 respectively, and which are joined at their opposing perimeters to form an enveloping structure, and which form cell walls for roughly half of the cells that comprise core 20 through the bonding of distal apexes 28 of corrugating or serpentine sheets 24 there to. To permit gas/air influx and efflux into and from the chamber defined by first and second panels 32a and 32b, valve 38 is disposed in one of the panels (here shown disposed in panel 32a). Presuming that the ends of cells 21 are not sealed and/or at least one wall in each cell is fluid/gas permeable, any fluid/gas within the chamber defined by first and second panels 32a and 32b will pass through valve 38 upon complete compression of body 30.

Each cell 21 in core 20 defines a longitudinal direction coincident with the cell axis or geometric "height" of the prism, and comprises for purposes of identification two leg walls and a base wall. For convention and with reference to FIG. 3, any given cell 21 comprises base wall 23 (123 in the embodiment illustrated in FIG. 4) and leg walls 25', 25"

(note that the leg walls are visually discrete but are formed from a single instance of corrugating or serpentine sheet 24a or 24b). Leg walls 25' and 25" form an angle θ there between, the value of which is proportional to the lateral length of base wall 23. As will be discussed in more detail below, the value of θ is a factor in core 20's restorative bias as well as the load capacity of inflatable body 30.

Figure 4:
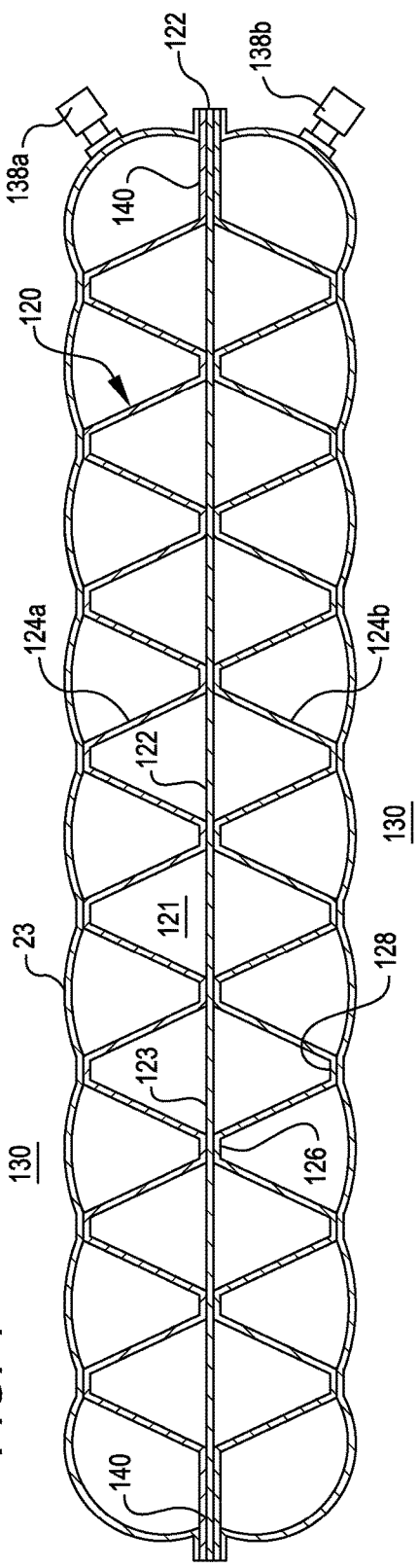
FIG. 4 is a cross section of an inflatable body having a core representative of a second invention embodiment.

Inflatable body embodiments of the invention need not only provide for a single chamber in which a core is disposed. With core 20 being longitudinally oriented and having planar sheet 22 essentially parallel to panels 32a and 32b as shown in FIG. 3, outward extension thereof to be included in the perimeter bond between panels 32a and 32b bifurcates the chamber, as best illustrated in FIG. 4. While not necessary, inclusion of one or both corrugating or serpentine sheets 24a and 24b in the peripheral bond may be desired, which is specifically illustrated in FIG. 4. Alternatively, chamber bifurcation can be achieved if only one or both corrugating or serpentine sheets 24a and 24b extend into the peripheral portion of panels 32a and 32b. For purposes of identification, any portion of core 20 extending outwardly there from and included in the peripheral bond between panels 32a and 32b is referred to as plenum portion 140.

In addition to providing increased structural integrity of inflatable body 130 over that of inflatable body 30, potential isolation between sub-chambers exists when planar sheet 122 and plenum portion 140 are fluid/gas impermeable. As shown in FIG. 4, inflatable body 130 includes two valves 138a and 138b, one for each sub-chamber. Again, suitable fluid/gas paths should exist to provide communication between cells 121 and the environment, at least within each sub-chamber. By establishing two sub-chambers in a stacked relationship, modulation of body 130's compression characteristics can be carried out. Just as inclusion of a box spring with a mattress provides benefit to a user over use of only a mattress, the ability to provide distinct degrees of compression resistance finds great utility to users of inflatable bodies. Inflatable bodies having a bifurcated chamber of the type illustrated in FIG. 4 provide a user in one possible respect with the ability to provide a firm basic supporting base providing maximum displacement from the inflatable body supporting surface, yet retain a comparatively compliant body interface. In another possible respect, having the more compliant sub-chamber acting as a basic supporting base permits the inflatable body to conform to irregular supporting surfaces without negatively impacting performance or comfort.

Figure 8:
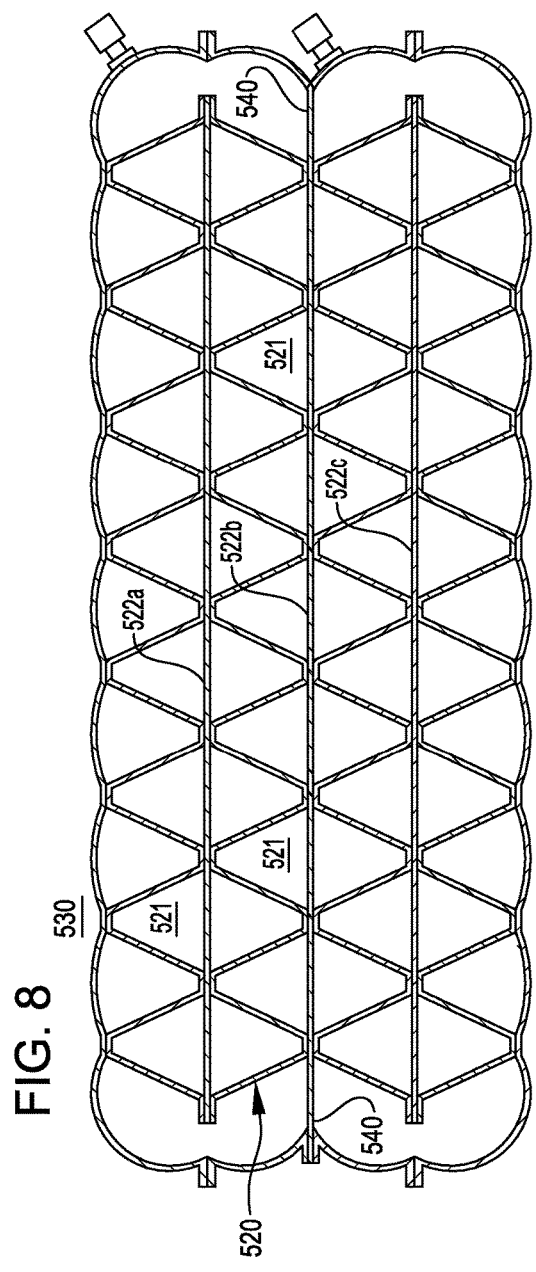
FIG. 8 is a cross section of an inflatable body having a core representative of a sixth invention embodiment.

The concept of multiple sub-chambers can extend to embodiments wherein multiple planar sheets are present, such as the embodiment shown in FIG. 8. In this illustrated embodiment, core 520 comprises four (4) rows of cells 521, and three (3) planar sheets 522a-c wherein sheet 522b extends from core 520 to form plenum portion 540. In most other material respects, inflatable body 530 is equivalent to inflatable body 130 in FIG. 4.

In addition to manipulation of core 20 to achieve certain performance benefits when constructing inflatable body 30, the skilled practitioner can modify the components thereof to achieve similar and additional benefits. Turning then to FIG. 5, inflatable body 230 is shown with core 220. Core 220 differs from core 20 in that corrugating or serpentine sheet 24a is not comprised of a single film material, but instead is comprised of a fluid/gas permeable material such as polyester or nylon batting, open cell foam (preferably urethane foam) and/or a laminate comprising foraminous urethane film; the last example being particularly useful in embodiments wherein the corrugating or serpentine sheets are in tension during use of the inflatable body given the poor tensile performance of thin foam material. Not only is fluid/gas permeability between adjacent cells increased, so is resistance to heat transfer through convection. Moreover, each row may intentionally have distinct thermal and other performance properties: pure film material, which is lighter in weight than batting material, can be used in one row to reduce overall core weight, yet the thermal performance benefit of batting material can still be exploited in another row.

As an additional benefit, each of the identified candidate corrugating or serpentine substitute sheet materials intrinsically has greater macro resiliency over thin urethane film material (as used herein, macro resiliency refers to large scale crumpling or crushing wherein large portions of the material or subject to compression as opposed to traditional point load deformation of a section of material). This macro resiliency in part mitigates the loss of restorative bias previously provided by cellular matrix cores of the prior art. In addition to material selection as a means for increasing macro resiliency, the more leg walls 25' and 25" approach the hypothetical orthogonal plane, the more macro resiliency they exhibit. Alternatively stated, the smaller the value of θ, the more leg walls 25' and 25" function as struts in true compression mode as opposed to beams bending in response to compression loading. Additionally, smaller values of θ result in less crowning of panels 32a and 32b, which are comprised of base walls 23, as well as greater shear stability due to the greater number of leg walls per unit area. The greater density of welds to panels 32a and 32b also create longitudinal stiffness in the inflatable body. This longitudinal stiffness creates a bias in the body to return to the generally planar if "rolled up", such as what is done when compressing the body to remove air entrapped therein.

As FIG. 6 demonstrates, plural chamber inflatable body embodiments are particularly amenable to the use of a fluid/gas permeable material such as polyester or nylon batting, open cell foam (preferably urethane foam) and/or a laminate comprising foraminous urethane film as a substitute for non-permeable corrugating or serpentine sheets.

Referring back to FIG. 3, the reader will note that each leg wall 25 is mechanically and nearly directly linked to a congruent, opposing leg wall 25 in an adjacent row (for ease of reference, the leg walls in the several drawings have been labeled such that leg wall 25' in one row mechanically links to a congruent leg wall 25' in an adjacent row so that the reader can better trace the preferred vector of tension force transmission between opposing panels 32a and 32b when the inflatable body is subjected to compression loading, which increases internal fluid/gas pressure and therefore results in panel displacement and induces tension in tensile elements in areas not subjected to the compression loading). As a consequence of this geometry, planar sheet 22, for example, is generally not subjected to any tension forces; only the bond interfaces between opposing leg walls presents a realistic location for failure. Because planar sheet 22 is therefore not considered a structural element in this sense, material selection opportunities are greatly increased.

The embodiment in FIG. 7 illustrates the use of a thin foam material, such as open cell urethane foam, as planar sheet 422. Thin foam material is generally not appropriate for applications wherein it is subject to localized tension forces, as tearing will likely occur, but it is a very good thermal insulator and is fluid/gas permeable. Its use as planar sheet 422 is appropriate in many embodiments of the invention due to its optional presence. In other words, a core not comprising a planar sheet or equivalent could perform as an effective tensile structure. Thus, while planar sheet 422 includes plenum portion 440, thereby forming two sub-chambers, fluid communication there between is possible due to its fluid/gas permeability, as shown by the arrows.

In a previous embodiment, intelligent selection of substitute material for corrugating or serpentine sheets 24*a* and 24*b* resulted in increased shape restoration bias, e.g., FIG. 5. Because the various inflatable bodies described herein are usually "rolled" up to force entrapped air there from, intelligent selection of a substitute material for planar sheet 22 can also impart a restorative bias to the body. Thus, for example, selection of a relative stiff planar sheet material, such as found in a closed cell foam, will create a bias towards the planar form, thereby assisting a rolled up inflatable body to unroll. When used in conjunction with corrugating or serpentine sheet substitute materials intrinsically having greater macro resiliency over thin urethane films, the combination provides for a reasonably self-inflating inflatable body.

With respect to any of the foregoing embodiments or other embodiments described herein, radiant mitigation means can be employed with respect to any film or sheet material. For example, substitution of aluminized MYLAR for urethane films would retain the benefits associated with the use of film material but provide enhanced resistance to heat transfer via radiation. Additionally or in lieu of, various film substitute sheet materials can be vapor coated with aluminum or other radiant reflective substance to enhance such material's resistance to heat transfer via radiation. Given mechanics and functionality of any given core when integrated into an inflatable body, a preferred embodiment of the invention comprises a foam planar sheet to which is selectively bonded at least one non woven or batting-type material as a serpentine or corrugating sheet, and at least one envelope panel having a radiant heat transfer mitigation treatment thereon, preferably on an interior surface thereof.

What is claimed:

1. A cellular matrix for use as a core in an inflatable body comprising:
    a first row of open-ended hollow prisms, each prism having a perimeter enclosing wall that includes a plurality of wall portions, the row having at least a first type of prism alternating with a second type of prism to form a repeating sequence of prisms wherein each prism in the row shares a common enclosing wall portion with a directly adjacent prism; and
    a second row of open-ended hollow prisms having at least the first type of prism alternating with the second type of prism to form a repeating sequence of prisms, wherein each row has a generally constant upper and lower boundary, wherein the first and second rows share a common boundary configured to permit fluid to bi-directionally pass from alternating first-row prisms only to an adjacent alternating second-row prism, wherein no row overlaps another row, when the matrix is in an expanded state, and wherein at least one wall portion of each cell forms part of a flexible panel that constitutes an element of the inflatable body.

2. The cellular matrix of claim 1, wherein the plurality of wall portions is formed from a single continuous sheet.

3. The cellular matrix of claim 1, wherein the prisms are triangular prisms.

* * * * *